Sept. 10, 1940. I. ERICKSON 2,214,668
SPOON HOOK
Filed March 9, 1939
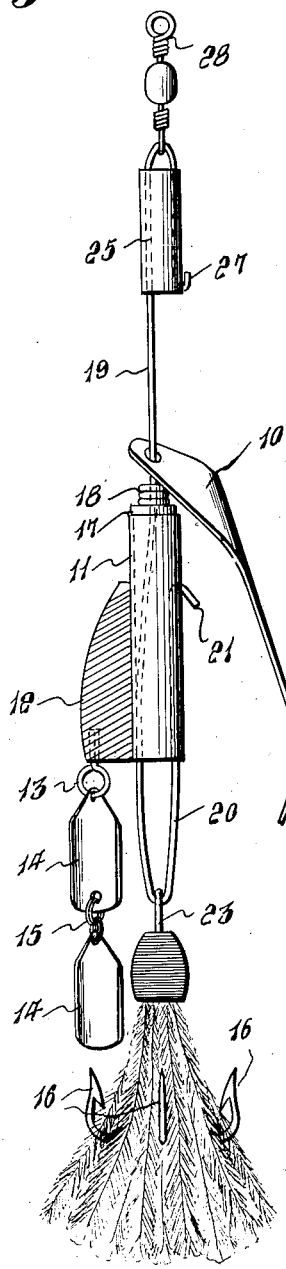
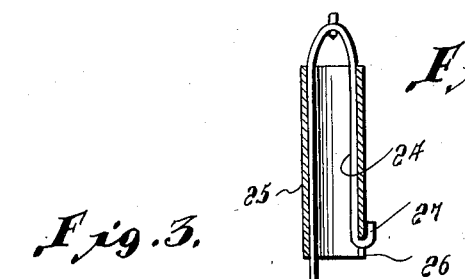
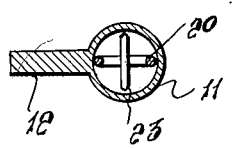
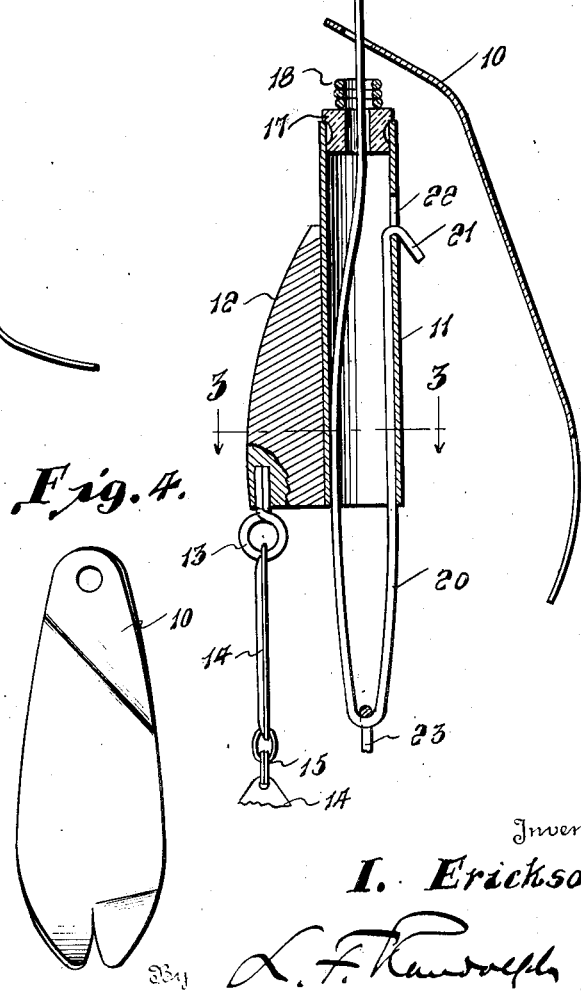
Inventor
I. Erickson
Attorney Patented Sept. 10, 1940

2,214,668

UNITED STATES PATENT OFFICE 2,214,668

SPOON HOOK

Ingemar Erickson, Mercer, Wis.

Application March 9, 1939, Serial No. 260,847

7 Claims. (Cl. 43—42)

This invention relates to a spoon hook device for fishing tackle and it aims to provide means whereby such a device will be a greater and more effective lure to the fish.

I particularly aim to provide an article of this kind having in combination with a spoon, an element having a keel to steer and balance and which suspends one or more flags adjacent to a feather bucktail or any other form of hook.

It is further aimed to provide a novel structure wherein the various parts may be assembled and replaced.

The more specific objects and advantages will become apparent from a consideration of the description following taken in connection with accompanying drawing illustrating an operative embodiment.

In said drawing:

Figure 1 is a view of the improved device;

Figure 2 is a view on an enlarged scale, in central longitudinal section;

Figure 3 is a cross section taken on the plane of line 3—3 of Figure 2, and

Figure 4 is a plan view of the spoon member.

Referring specifically to the drawing wherein like reference characters designate like or similar parts, the invention uses in connection with a loosely or rotatably mounted spoon 10, which may be of conventional form, a tubular body 11 having a keel 12 extending therefrom and pivotally suspending by means of an eyelet or the like 13, one or more tags 14. When more than one tag is employed, they are connected together flexibly as at 15. Such tags are located adjacent the hook means shown at 16, which may be a treble buck hook, feather bucktail or any equivalent. At the top of the tubular body 11 is an eyelet 17 of agate or any other suitable material and fastened thereto are bearing rings 18.

Said spoon 10 may be conventional. The tube 11 may be of any suitable material but particularly of copper, nickel plated, or brass. The tags 14 may be of the same material as the tube 11.

The various parts mentioned are preferably removably mounted on a metallic wire or strand 19 which has a loop 20 at its lower end, the terminal of which has a hook 21 passing through an opening 22 in the tube. The expansive action of the loop 20 prevents detachment of the hook 21 from opening 22 and detachment of tube 11 from the loop. The device 16 by means of a conventional eyelet 23, may be threaded onto the loop at the hook end 21, when the latter is detached from the hook and tube raised along the wire 19 above the hook.

Said wire or strand 19 passes through the eyelet 14 and bearings 18, and spoon 10 and at its upper end has a loop 24 removably engaged by a tube or ferrule 25, having a notch 26 in the lower edge thereof engaged by a hook 27 at the terminal of loop 24. Loop 24 is expansive. In combination with the loop and ferrule 25, connection of the loop to the fishing line may be made, as through the medium of a swivel 28.

Various changes may be resorted to provided they fall within the spirit and scope of the invention.

I claim as my invention:

1. Fishing apparatus having a body attachable to a line, a keel extending from said body, and tag means suspended from said keel, and hook means suspended in line with the body below said tag means.

2. Fishing apparatus having a body attachable to a line, a keel extending from said body, tag means suspended from said keel, and baiting means suspended in line with the body below said tag means.

3. Fishing apparatus of the class described having a tube, a strand having a loop passing through the tube, a detachable connection between the loop and tube, said loop being adapted at its lower end to support a hook, a keel extending from the tube, and tag means suspended from said keel.

4. Fishing apparatus of the class described having a tube, a strand having a loop partly in the tube, a detachable connection between the loop and tube, said loop being adapted at its lower end to support a hook, a keel extending from the tube, tag means suspended from said keel, and a spoon engaging said strand above said tube, said detachable connection comprising a hook at the free end of the loop and an opening in said tube through which opening the hook extends.

5. Fishing apparatus of the class described having a tube, a strand having a loop partly in the tube, a detachable connection between the loop and tube, said loop being adapted at its lower end to support a hook, a keel extending from the tube, tag means suspended from said keel, and a spoon engaging said strand above said tube, said detachable connections comprising a hook at the free end of the loop and an opening in said tube through which opening the hook extends, said tube having an eyelet and bearings at the top thereof through which the strand extends, said strand at its upper end having a loop provided with a hook, and a ferrule expansively engaged in its bore by said second mentioned loop and having a notch in its lower end engageable by the hook of the second mentioned loop.

6. Fishing apparatus having a body attachable to a line, a keel extending from said body, tag means suspended from said keel, in combination with means to suspend baiting means adjacent said tag means.

7. Fishing apparatus of the class described having a tube attachable to a line, a keel extending from said tube, tag means suspended from said keel, and means to suspend baiting means from the tube.

INGEMAR ERICKSON.